United States Patent [19]

Sageshima et al.

[11] Patent Number: 4,960,194
[45] Date of Patent: Oct. 2, 1990

[54] CENTRIFUGAL CLUTCH

[75] Inventors: Akira Sageshima, Kunitachi; Tadashi Ozaki, Yokosuka; Hirozi Kawasaki, Fussa; Isao Masuda, Tachikawa, all of Japan

[73] Assignee: Kioritz Corporation, Tokyo, Japan

[21] Appl. No.: 307,546

[22] Filed: Feb. 8, 1989

[30] Foreign Application Priority Data

Feb. 23, 1988 [JP] Japan .................. 63-38649
Feb. 23, 1988 [JP] Japan .................. 63-21897

[51] Int. Cl.$^5$ .............................. F16D 43/18
[52] U.S. Cl. .................. 192/103 B; 192/105 CD; 192/107 M
[58] Field of Search ..... 192/103 B, 105 BA, 105 CD, 192/105 CB, 107 M

[56] References Cited

U.S. PATENT DOCUMENTS

| | | | |
|---|---|---|---|
| 1,983,661 | 12/1934 | Frantz et al. ............... | 192/105 CS |
| 2,355,419 | 8/1944 | Bruce ......................... | 192/107 M |
| 2,359,361 | 10/1944 | Gleszer et al. ............. | 192/107 M |
| 2,581,926 | 1/1952 | Groten et al. .............. | 192/107 M |
| 2,718,936 | 9/1955 | Rohrer et al. .............. | 192/107 M |
| 3,712,438 | 1/1973 | Roddy et al. ............... | 192/107 M |
| 3,718,214 | 2/1973 | Newman ..................... | 192/105 CD |
| 3,945,478 | 3/1976 | Kellerman .................. | 192/107 M |
| 4,821,859 | 4/1989 | Suchdev et al. ............ | 192/105 CD |

FOREIGN PATENT DOCUMENTS

| | | | |
|---|---|---|---|
| 1035480 | 1/1959 | Fed. Rep. of Germany . | |
| 404162 | 11/1909 | France . | |
| 1025315 | 4/1953 | France . | |
| 0097323 | 6/1984 | Japan ........................... | 192/107 M |
| 0266236 | 11/1987 | Japan ........................... | 192/107 M |

Primary Examiner—Leslie A. Braun
Assistant Examiner—Nicholas Whitelaw
Attorney, Agent, or Firm—Browdy and Neimark

[57] ABSTRACT

Disclosed is a centrifugal clutch of the type that includes a driving side member, a driven side member and a plurality of clutch shoes each having one end connected to the driving side member, the other end being capable of being friction-engaged with the driven side member, the driving side member and the clutch shoes being integrally formed using a high specific gravity resin type composite material.

2 Claims, 2 Drawing Sheets

CENTRIFUGAL CLUTCH

BACKGROUND OF THE INVENTION

This invention relates to a centrifugal clutch.

A centrifugal clutch is composed of driving members, which are connected to driving means, and a driven member. The driving members consist, for example, of a clutch boss member and a plurality of clutch shoes mounted on the clutch boss member in such a manner as to be radially movable. The latter consists, for example, of a clutch drum arranged concentrically with respect to the clutch boss member. In such a centrifugal clutch, centrifugal force generated through rotation of the clutch boss member causes the clutch shoes to move outwardly in the radial direction. As a result, the clutch shoes are friction-engaged with the inner peripheral surface of the clutch drum, thereby transmitting the driving force from the clutch boss member to the clutch drum. Generally speaking, the clutch boss member and the clutch shoes of such a centrifugal clutch, both made of a metal such as sintered alloy, are separately manufactured as individual parts. Further, the surface of each clutch shoe which is friction-engaged with the inner surface of the clutch drum is equipped with an appropriate lining member. Such a construction inevitably involves a large number of parts. In addition, it takes much time and cost to manufacture and assembly them. Furthermore, a centrifugal clutch thus manufactured is rather heavy.

In order to eliminate the above problems, there has been proposed a centrifugal clutch construction that transmits a relatively low torque in which the clutch boss member and the clutch shoes are integrally formed using a plastic material. However, this proposed construction has a rather small specific gravity, so that it must having a considerably large size to be able to transmit torque satisfactorily. Furthermore, the heat generated between the clutch shoes and the clutch drum causes, in particular, the outer peripheral portions of the clutch shoes to melt and be deformed. In addition, since the clutch shoes and the clutch boss member do not conduct heat satisfactorily, their temperature rises, resulting in a considerable deterioration of operational force and strength. This also involves changes in clutch-in revolution. Because of these problems, this proposed construction has not yet been put into practical use.

Furthermore, a centrifugal clutch is a device of which considerable strength and accuracy are required. Accordingly, conventional centrifugal clutches of the type described above need the insertion of relatively hard reinforcing members of a metal or non-metal material in the section where the clutch boss member is mounted in order to secure fitting accuracy of the clutch and reinforce the clutch boss member which is fixed to a driving shaft. Accordingly, even when the clutch boss member and the clutch shoes are integrally manufactured using a plastic material, the steps of manufacturing and inserting the above-mentioned reinforcing members cannot be avoided, so that this proposed construction does not lead to reduced manufacturing costs. In addition, because of the necessity of providing reinforcing members, this conventional centrifugal clutch cannot be employed in a machine which does not easily allow the operation of inserting such reinforcing members during its manufacture.

SUMMARY OF THE INVENTION

It is accordingly an object of this invention to eliminate the above problems encountered in conventional centrifugal clutches and to provide a centrifugal clutch having a simple and convenient configuration.

This invention provides a centrifugal clutch of the type that includes a driving side member, a driven side member and a plurality of clutch shoes each having one end connected to the driving side member, the other end being capable of being friction-engaged with the driven side member, with the driving side member and the clutchshoes being integrally formed using a high specific gravity resin type composite material.

As stated above, the construction of the centrifugal clutch in accordance with this invention is such that the driving side member and the plurality of clutch shoes are integrally formed using a high specific gravity resin type composite material. Thanks to this construction, the centrifugal clutch of this invention can be composed of a reduced number of components as compared to conventional clutches, so that it can be manufactured and assembled with ease and reduced cost. In addition, this construction improves the heat resistance of the clutch shoes, augments the centrifugal weight of the clutch shoes to improve the torque transmitting capacity of the clutch shoes, and improves the heat resistance thereof. Further, it helps to restrain the heat generation to a remarkable degree.

Furthermore, there is provided in accordance with this invention a centrifugal clutch of the type that includes a clutch boss member mounted on a driving shaft, a clutch drum mounted on a driven shaft, and clutch shoes movably connected to said clutch boss member and capable of being friction-engaged with said clutch drum, said clutch boss member having a central hole into which said driving shaft is inserted, one end surface of said clutch boss member abutting against a section of said driving shaft, said clutch boss member having in the central hole thereof a guide hole section into which a sleeve-like nut is fitted from the side of the other end surface of said clutch boss member in such a manner as to be brought into matching or slightly forced engagement therewith, a screw section formed on said driving shaft and a screw section formed in said sleeve like nut being brought into engagement with each other, and a large-diameter end section formed on said sleeve-like nut abutting against said other end surface of said clutch boss member.

As stated above, this invention provides a centrifugal clutch which is so constructed that the clutch boss member thereof includes a central hole into which the driving shaft is inserted, one end surface of the clutch boss member abutting against the section of said driving shaft, the central hole of the clutch boss member including a guide hole section into which a sleeve-like nut is fitted from the side of the other end surface of the clutch boss member in such a manner as to be brought into matching or slightly forced engagement therewith, a screw section formed on said driving shaft and a screw section formed in said sleeve-like nut being brought into engagement with each other, and a large-diameter end section formed on said sleeve-like nut abutting against said other end surface of said clutch boss member. Accordingly, by fitting the sleeve-like nut into the guide hole section of the clutch boss member while bringing the screw section of the sleeve-like nut into engagement with that of the driving shaft, the clutch boss member can be fixed to the driving shaft easily and positively, with the clutch boss member being held between the driving shaft section and the large-diameter end of the sleeve-like nut. Thanks to this construction, the mounting accuracy of the clutch boss member can be easily obtained, i.e., the centering thereof can be effected with ease. Furthermore, since the insertion of reinforcing members is not required, the number of parts and the manufacturing cost can be reduced.

DESCRIPTION OF THE PREFERRED EMBODIMENTS

Embodiments of this invention will now be described with reference to the attached drawings.

Figure 1:
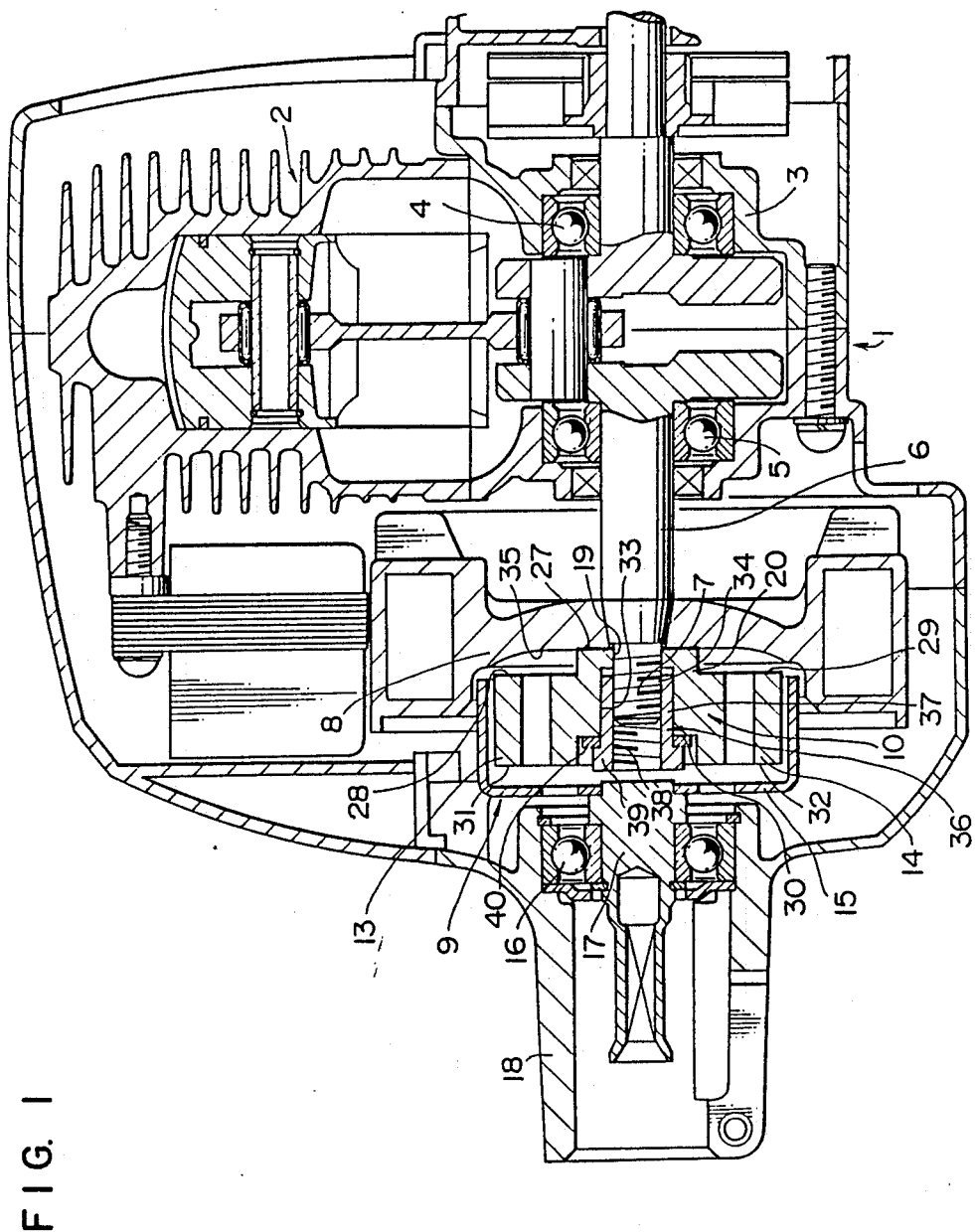
FIG. 1 is a longitudinal sectional view of the essential part of a grass trimmer equipped with an embodiment of a centrifugal clutch in accordance with this invention.

FIG. 1 shows the present invention as applied to a grass trimmer. This grass trimmer includes a body 1, with an internal combustion engine 2 as the driving means provided therein. A cooling fan 8 and a centrifugal clutch 9 in accordance with this invention are attached to the front end section 7 of a crank shaft 6 which is rotatably supported by a crank case 3 through the intermediary of bearings 4 and 5.

Figure 2:
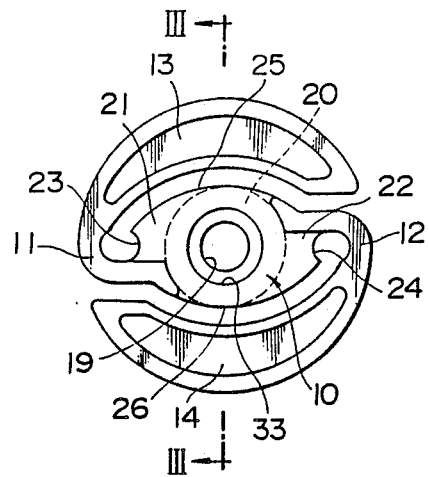
FIG. 2 is a front view of a clutch boss member of the centrifugal clutch of FIG. 1.
Figure 3:
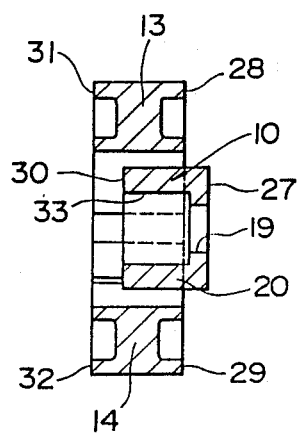
FIG. 3 is a sectional view taken along the line III—III of FIG. 2.

As shown in FIGS. 2 and 3, the centrifugal clutch in the embodiment shown is equipped with a clutch boss member 10 and a pair of clutch shoes 13 and 14 as the driving side members. The clutch boss member 10 and the clutch shoes 13 and 14 are integrally formed using a high specific gravity resin type composite material, as described below. Said clutch boss member 10 includes a boss section 20 having a central hole 19 into which a drive shaft such as the crank shaft 6 of an internal combustion engine 2 is fitted and a pair of arms 21 and 22 which are integrally formed on the opposite sides of a diameter of the boss section 20, with the arms 21 and 22 extending from the sides of said boss section 20 outwardly in the radial direction, and having a thickness smaller than that of said boss section 20. The widths of the arms 21 and 22 gradually diminish toward outer radial ends 23 and 24 thereof, respectively. Said boss section 20 and the arms 21, 22 form on the diametrically opposite side a pair of continuous arc-like side edge sections 25 and 26.

While the clutch shoes 13 and 14 have approximately the same arc-like configuration, one clutch shoe 13 is integrally connected at one end 11 thereof to the outer radial end 23 of one arm 21 and extends along the arc-like side edge section 25 with a clearance therebetween, the other free end of said one clutch shoe 13 being arranged in the vicinity of the outer radial end 24 of the other arm 22 of said clutch boss member 10. The other clutch shoe 14 is integrally connected at one end thereof to the outer radial end 24 of the other arm 22 of said clutch boss member 10 and extends along the arc-like side edge section 26 of said clutch boss member 10 with a clearance therebetween, the other free end of said other clutch shoe 14 being arranged in the vicinity of the outer radial end 23 of said one arm 21 of said clutch boss member 10. Further, the section 11 where the outer radial end 23 of the one arm 21 of said clutch boss member 10 is connected to one end of said one clutch shoe 13 as well as the section 12 where the outer radial end 24 of the other arm 22 of said clutch boss member 10 is connected to one end of the other clutch shoe 14 have their thickness diminished, relatively large circular clearances connected to said clearances being respectively formed inside the sections 11 and 12. Thus, said clutch boss member 10 and the pair of clutch shoes 13 and 14 are integrally formed in a point-symmetrical, S-like configuration with respect to the central axis of the clutch boss member 10, as shown in FIG. 2. Further, said clutch boss member 10 and the pair of clutch shoes 13 and 14 are so arranged that one end surface 27 of the clutch boss member 10 axially protrudes to some degree from respective end surfaces 28 and 29 of the clutch shoes 13 and 14.

Said pair of clutch shoes 13 and 14 are arranged in such a manner that the respective outer radial ends thereof are opposed to the inner peripheral surface of the clutch drum 15 which represents the driven side member. When in use the clutch boss member 10 is rotated, the clutch shoes 13 and 14 are elastically deformed in the sections 11 and 12 where they are connected to the clutch boss member 10. This causes them to move outwardly in the radial direction and be friction-engaged with the inner peripheral surface of the clutch drum 15, thereby transmitting the torque of the clutch boss member 10 to the clutch drum 15.

The clutch boss member 10 and the clutch shoes 13 and 14 thus constructed are integrally formed using a high specific gravity resin type composite material. This high specific gravity resin type composite material consists of a die formable material composed of a plastic material which is relatively heat resistant (e.g., nylon), a metal or non-metal material which is added for the purpose of augmenting the specific gravity and improving the thermal conductivity (e.g., zinc), and a reinforming material added for the purpose of improving the strength and the elasticity (e.g., glass fiber, carbon fiber or the like).

A suitable example of such a high specific gravity resin type composite material may be one which is composed of a mixture of 25 wt. % of nylon, 65 wt. % of zinc and 10 wt. % of glass fiber.

The clutch boss member 10 and the clutch shoes 13 and 14 were integrally formed, using this high specific gravity resin type composite material, resulting in a considerably high specific gravity of 2.78. Further, the clutch thus formed exhibited a tensile strength of 1450 kgf/cm$^2$, a bending elastic modulus of 95,000 kgf/cm$^2$, a thermal deformation temperature of 210° C. (18.6 kgf/cm$^2$), and a linear expansion coefficient of $3 \times 10^5$ cm/cm/°C. Thus, the clutch provided quite satisfactory physical properties. The clutch shoes got well run in with the configuration of the clutch drum with which they are friction-engaged, and were able to transmit a high torque. Furthermore, the noise emanating from the centrifugal clutch was advantageously very low.

Further, the centrifugal clutch 9 includes the clutch drum 15 which is concentrically arranged with respect to the clutch boss member 10 and the inner peripheral surface of which is radially opposed to the clutch shoes 13 and 14. The clutch drum 15 is connected to a driven shaft 17 which is rotatably supported by the body 1 through the intermediary of a bearing 16. Provided at the front end 18 of the body 1 is an elongated operating rod (not shown). Attached to the front end of this operating rod is a rotary cutter (not shown) for cutting grass. A transmission shaft (not shown) is rotatably supported within said operating rod, and connects the driven shaft 17 to the rotary cutter.

When the internal combustion engine 2 is driven to rotate the crank shaft 6, the cooling fan 8 is driven to suck in air from outside. The air flow is led to the section around the cylinder of the internal combustion engine 2 to cool the same. At the same time, the clutch boss member 10 of said centrifugal clutch 9 is also driven. As a result, the clutch shoes 13 and 14 are moved outwardly in the radial direction by the centrifugal force generated and are friction-engaged with the inner peripheral surface of said clutch drum 15, thereby rotating the clutch drum 15 as well as said driven shaft 17. The torque of the driven shaft 17 is transmitted to the rotary cutter to rotate the same. The operator can perform grass trimming work using the rotary cutter as he manipulates the operating rod.

The boss section 20 of said clutch boss member 10 includes a guide hole section 33 formed in the central hole 19 thereof. The front end section 7 of said crank shaft 6 extends into the guide hole section 33. A male screw 34 is formed around the front end section 7 of the crank shaft 6. When said clutch boss member 10 is attached to the front end section 7 of the crank shaft 6, as shown in FIG. 1, one end surface 27 of said boss section 20 abuts against an end surface 35 of the cooling fan 8.

The sleeve-like section 37 of a sleeve-like nut 36 is inserted into said guide hole section 33 from the side of the other end surface 30 of the boss section 20 of said clutch boss member 10. A female screw section 38 is formed on the inner peripheral surface of the sleeve-like section 37. This female screw section 38 is engaged with the male screw section 34 formed in the front end section 7 of said crank shaft 6. At the same time, the sleeve-like section 37 is fitted into the guide hole section 33 of the boss section 20 of said clutch boss member 10 in such a manner that the outer peripheral surface of the sleeve-like section 37 is brought into matching or slightly forced engagement with the inner peripheral surface of the guide hole section 33. Further, said sleeve-like nut 36 includes a large-diameter section 39 formed at the outer end. This large-diameter section 39 is engaged with said other end surface 30 of the boss section 20 of the clutch boss member 10 through the intermediary of a washer 40, thereby holding the boss section 20 in such a manner that it cannot be detached outwardly in the axial direction from the front end section 7 of the crank shaft 6.

Figure 4:
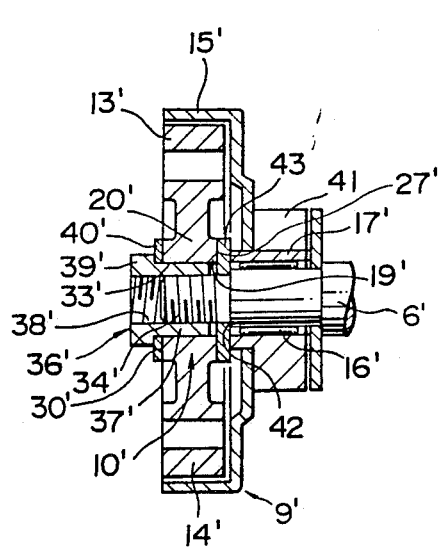
FIG. 4 is a longitudinal sectional view of the essential part of another embodiment of this invention.

In another embodiment of this invention shown in FIG. 4, a centrifugal clutch 9' is applied to the driving system of a sprocket 41 for driving the saw chain of a chain saw. The construction and the operation of this centrifugal clutch 9' is similar to those of the embodiment shown in FIGS. 1 to 3. A sleeve-like nut 36' used in the centrifugal clutch 9' is also constructed and operates in the same manner as the sleeve-like nut 36 in the first embodiment. Accordingly, a detailed description of the centrifugal clutch 9' and the sleeve-like nut 36' will be omitted, the components of this embodiment which are identical with those of the first one being referred to by the same reference numerals. This embodiment differs from the first one in that a driven shaft 17' to which the clutch drum 15' of the centrifugal clutch 9' is attached is arranged concentrically around the outer peripheral surface of a crank shaft 6' through the intermediary of a bearing 16', the sprocket 41 being mounted on this driven shaft 17' along with the clutch drum 15'. Further, another washer 43 is arranged between one end surface 27' of the boss section 20' of a clutch boss member 10' and a large-diameter adjacent end 42 of the crank shaft 6', thereby causing the clutch boss member 10' and the driven shaft 17' to rotate independently of each other.

What is claimed is:

1. A centrifugal clutch of the type that includes a clutch boss member mounted on a driving shaft, a clutch drum mounted on a driven shaft, and clutch shoes movably connected to said clutch boss member and capable of being friction-engaged with said clutch drum, said clutch boss member having a central hole into which said driving shaft is inserted, one end surface of said clutch boss member abutting against a section of said driving shaft, said clutch boss member having in the central hole thereof a guide hole section into which a sleeve-like nut is fitted from the side of the other end of said clutch boss member in such a manner as to be brought into matching or slightly forced engagement therewith, a screw section formed on said driving shaft and a screw section formed in said sleeve-like nut being brought into engagement with each other, and a large-diameter end section formed on said sleeve-like nut abutting against said other end surface of said clutch boss member.

2. A centrifugal clutch as claimed in claim 1, wherein the driven shaft on which said clutch drum is mounted is arranged around the outer peripheral surface of said driving shaft through the intermediary of a bearing, a sprocket being mounted on said clutch drum, and said clutch boss member and said driven shaft are capable of rotating independently of each other.

* * * * *